United States Patent [19]

Rausing

[11] Patent Number: 4,512,832
[45] Date of Patent: Apr. 23, 1985

[54] METHOD FOR MANUFACTURING A TUBE PACKAGE

[75] Inventor: Hans Rausing, Lund, Sweden

[73] Assignee: Tetra Pak Developpement SA, Pully, Switzerland

[21] Appl. No.: 389,567

[22] Filed: Jun. 17, 1982

[30] Foreign Application Priority Data

Jun. 18, 1981 [SE] Sweden .............................. 8103848

[51] Int. Cl.³ .............................................. B29C 27/10
[52] U.S. Cl. ......................................... 156/86; 156/69;
156/198; 156/218; 156/244.13; 156/244.15;
156/244.18; 156/294; 264/342 R
[58] Field of Search ...................... 428/35; 222/107;
156/86, 84, 198, 218, 69, 293, 294, 244.13,
244.15, 244.18; 264/342 R

[56] References Cited

U.S. PATENT DOCUMENTS

| | | | |
|---|---|---|---|
| 3,817,427 | 6/1974 | Neff et al. | 222/107 |
| 3,946,905 | 3/1976 | Cogliano | 222/107 |
| 3,958,721 | 5/1976 | Kushida et al. | 222/107 |
| 4,014,724 | 3/1977 | Rausing | 156/218 |
| 4,365,460 | 12/1982 | Cress et al. | 156/86 |

*Primary Examiner*—George F. Lesmes
*Assistant Examiner*—P. R. Schwartz
*Attorney, Agent, or Firm*—Burns, Doane, Swecker & Mathis

[57] ABSTRACT

A tube package of plastic material which includes a tubular shell part together with end closures front and back. The shell part is constituted of a cylinder of molecular-oriented plastic material, and its front end closure of a curved shrunk portion of the extension of the shell part. The rear closure of the shell part is constituted of a transversely sealed portion of the shell part.

6 Claims, 5 Drawing Figures

METHOD FOR MANUFACTURING A TUBE PACKAGE

BACKGROUND AND SUMMARY OF THE PRESENT INVENTION

The present invention relates generally to packing containers. More specifically, the present invention relates to a tube package of plastic material including a tubular shell part together with end closures front and back. The invention also relates to a method for the manufacture of tube packages.

The use and manufacture of tube packages made of plastic material have been known for a long time. These packages are generally manufactured so that a seamless tube of plastic material is extruded through a plastic extruder including a circular extruder die, the extruded tube being cut off in suitable lengths. These cut tube portions may be provided with a relatively rigid "tube bracing", also containing a cap which may be of the traditional type with a threaded closure top. This "bracing" of the tubes is obtained in such a manner that one end of the tubes is partly introduced into an injection mould, whereupon a molten plastic is pressed into the mould under pressure so that the space of the mould is filled with plastic which also fuses together with the edge zone of tube part inserted into the mould space. Similarly, the tube can then be filled in a traditional manner through its open end and be closed by transverse sealing along the end.

The manufacture of such plastic tubes is relatively slow, however, and therefore expensive and the tubes are difficult to imprint. The reason for the slowness of the method is that the extrusion of tube for technical reasons can take place only at a few meters per minute and that the injection moulding of the "tube bracing" requires a long cooling time.

The abovementioned inconveniences are overcome by the present invention which is characterized in that the shell part of the tube package consists of a molecular-oriented plastic material which has a longitudinal overlap joint. The rear end closure of the tube is constituted of a flattened and transversely sealed portion of the shell part, and the front end closure is constituted of a curved, shrunk portion of the extension of the shell part. The front part of the shrunk portion is provided with a closed emptying opening.

The invention is also characterized by the method for the manufacture of the tube part which involves longitudinally orienting by stretching an extruded web of acrylonitrile plastics (BAREX). The web is printed with the desired text and decoration, and is then divided by longitudinal cutting lines into a number of partial webs. Each of the partial webs is folded to a tube by cutting the webs into lengths corresponding to a tube packing unit and the longitudinal edges of the partial web lengths are joined to one another by overlap joints. The tube formed is threaded onto a mandrel, and is heated and caused to shrink around the profiled end surface of the mandrel so as to form an emptying opening. A separately manufactured cap portion is welded around the emptying opening, the tube is then filled with contents through its open end and the open end is closed by flattening and sealing.

BRIEF DESCRIPTION OF THE DRAWINGS

The invention will be described in the following with reference to the attached schematic drawings, wherein.

DETAILED DESCRIPTION OF THE PREFERRED EMBODIMENT

Figure 1:
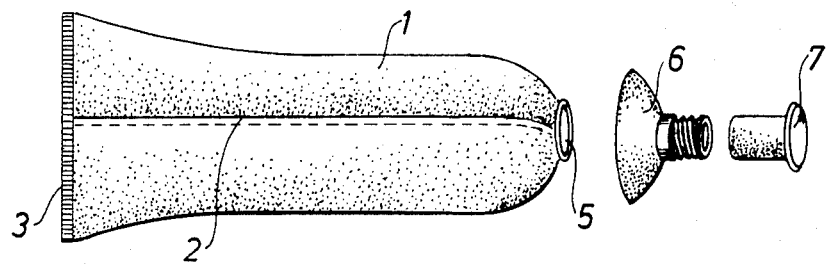
FIG. 1 is a perspective exploded view of a tube package in accordance with the present invention.

In the manufacture of the tube in accordance with the invention in the first place a suitable material had to be produced. The plastic material from which the tube is made may be constituted in general of a laminate between various plastic materials, e.g. polyethylene, polypropylene, polyester, etc., but a very suitable material for the manufacture of tube packages in accordance with the invention has proved to be the type of acrylonitrile plastics marketed under the trade-name BAREX. This material has the advantage that it is easy to extrude, to orientate and very easy to weld with the help of a high-frequency technique. Furthermore, the acrylonitrile material (BAREX) has very good gas-tightness, especially for oxygen, and the material is resistant, moreover, to most chemicals and solvents. Hence the tube package in accordance with the invention is suitable for the packing of products sensitive to oxidation and products of the type of paints etc. In the present embodiment it will thus be assumed that the plastic material is constituted of BAREX.

The material is prepared in such a manner that a wide web of the material is extruded through a slot-shaped extruder die, whereupon the material web is subjected to stretching in its longitudinal direction, while at the same time the original width of the web is maintained or increased by allowing it to pass through a number of rollers positioned close to one another which prevent a so-called "necking" effect, that is to say a constriction of the web when subjected to stretching. The orientation of the web is carried out at a temperature of the plastics of approx. 70°–90° C. and takes place so that the web is allowed to pass between a plurality of pairs of cooperating rollers (not illustrated). A front pair of the rollers rotates at a higher peripheral speed than a rear pair of rollers which in turn rotates at a peripheral speed which substantially corresponds or slightly exceeds the delivery speed of the extruder. Owing to the pairs of rollers having different feed speed, the web portions between the roller pairs will be subjected to stretching which in turn brings about a molecular orientation of the material. The rollers to prevent the shrinking together of the web in transverse direction during the stretching, which web is located between the front and rear pairs of rollers, subject the web also to minor orientation-stretching crossways. A more comprehensive transverse orientation can be obtained if the edges of the web are pulled from one another at the same time, so that the material is stretched in a transverse direction.

After the oriented material, which is also subjected to a reduction in thickness, has been allowed to cool down it either can be rolled up into a magazine roll or it can be printed directly by an optional printing method in order to apply the desired package design, e.g. text or decoration to the web. The printed web can be divided subsequently into parallel partial webs, each including a complete width of decoration. Then each of the partial webs is cut into sheets which are formed to tubes by joining together the edge zones of the partial webs and fusing them to a tight and durable overlap joint. Each of the said partial webs is substantially longitudinally oriented although, as mentioned above, a certain transverse orientation occurs owing to the web being maintained at constant width during the stretching. Since for the shrinking of the dome-shaped part the material has to have an orientation in the transverse direction of the tubes formed, the tubes are made in such a manner that a piece of the front portion of the partial webs, slightly exceeding the circumference of the finished tube package, is cut off. The part cut off is folded into a tube by joining together the front edge and middle edge of the partial web on the part of the web cut off, in an overlap joint. It follows from this that the width of the partial web should correspond substantially to the length of a tube package (or two packages if a simultaneous manufacture of two tube package units is taking place according to the method described further down). If the BAREX web instead is substantially molecular-oriented in its transverse direction, which can be done by successive pulling apart of the web edges in transverse direction until an appropriate degree of orientation has been achieved, the partial webs formed may instead be made into a continuous tube whose longitudinal axis coincides with the longitudinal axis of the partial webs. Thereupon the continuous tube is divided up into tube units, each corresponding to a tube package unit, whereupon the tube units are subjected in the manner described to shrinkage on a mandrel, filled and closed.

Figure 2:
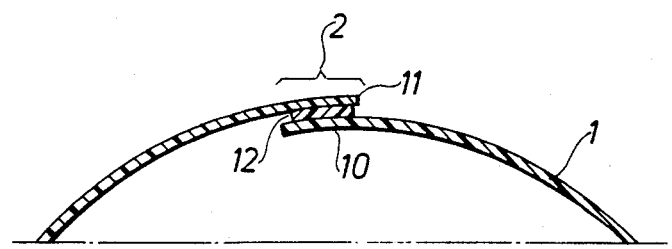
FIG. 2 is a cross-sectional view of a part of the tube from which the package of FIG. 1 is manufactured, FIG. 3 are side elevational views of the tube being shaped on a mandrel.

In principle the sealing of the overlap joint can easily involve a release of the orientation stresses of the material and a shrinkage of the material in the longitudinal joint which is deformed. This can be prevented in general if the material can be maintained stretched during the sealing. Should this prove to be difficult, it is possible instead, in order to fuse together directly the overlapping portions in accordance with FIG. 2, to extrude a sliver of molten BAREX material 12, or of a plastic material compatible with BAREX, on either or both of the overlapping edge zones 10 and 11 which are then pressed together. This method has the advantage that the heat from the extruded plastic sliver 12 is transmitted to the surface layer of the overlapping edge zones 10 and 11 and causes a superficial fusing together with the sliver 12 placed there, while the orientation stresses of the oriented BAREX material are not released and any shrinkage in the edge zone is thus avoided.

Figure 3:
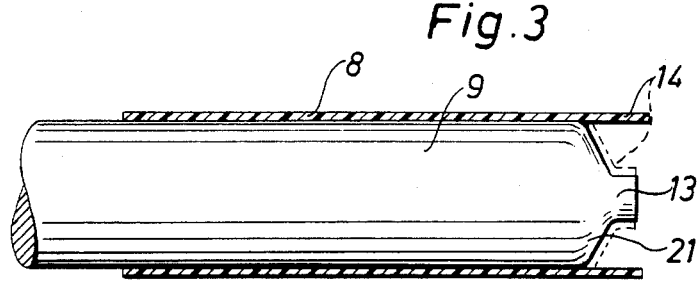

The tube 1, sealed along a longitudinal joint, thus formed can be produced either in lengths 8 corresponding to a tube package unit or else in greater lengths to be divided later into lengths corresponding to a tube package unit. With reference now to FIG. 3 a tube length 8 is applied to a mandrel 9, this mandrel having a profiled front part 21 which in the present case continues in a cylindrical portion 13. After the tube part 8 has been threaded onto a mandrel, heat is applied, preferably in the form of hot air or radiation heat, to the front portion 14 of the tube part which is not in any contact with the mandrel 9. By the heating the orientation stresses in the material are released causing the plastic material to shrink so as to fit accurately against the profiled part 21 of the mandrel 9. The front part 14 of the tube 8 is thus shaped in the manner as illustrated by the broken line in FIG. 3. After the shaping the mandrel 9 may be pulled out of the tube 8. After the shaping operation the tube 8 has obtained an emptying opening which is substantially smaller than the cross-sectional area of the tube, and, as is evident from what has been said above, the emptying opening may be surrounded by a projecting flange if this is required. Around the emptying opening or on the flange can be welded prefabricated, e.g. injection moulded, cap arrangement 6, 7 (see FIG. 1) which is provided with threads. A screw top can be welded easily on the emptying opening because of the BAREX material's ready weldability with the help of high-frequency. The actual welding may take place so that the prefabricated part is pressed to fit over the emptying opening on the tube by a tool (not illustrated) which at the same time includes a high-frequency coil. When an electric high-frequency field is generated, the material will be heated so that a fusing together between adjoining plastic parts is achieved. To obtain the required counter-pressure it may be appropriate to weld on the cap arrangement before the inner mandrel 9 has been removed from the tube.

A simpler opening and emptying arrangement can be obtained if the projecting flange 12, as shown in FIG. 3, is pressed together and sealed with the help of heat. This arrangement can subsequently simply be cut off when the tube package is to be opened.

Figure 4:
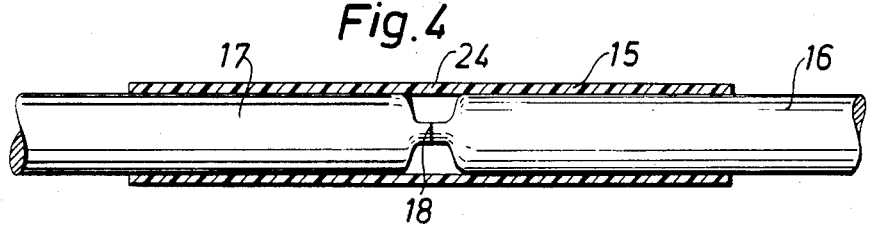
FIGS. 4 and 5 are side elevational views of a tube length corresponding to two tube packages being shaped on a divisible mandrel.
Figure 5:
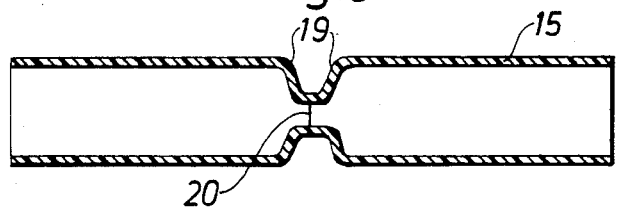

In accordance with FIG. 4 the method of manufacture can be improved by shrinking together at the same time two pieces of packages in one operation. As is evident from FIG. 4, the mandrel will then consist of two parts 16,17, these parts being separable from one another along a dividing line 18. The simultaneous manufacture of two package units takes place in such a manner that a tube 15 of orientation-stretched plastic film sealed along a longitudinal joint is threaded onto the combined mandrels 16,17. Thereupon the part 24 of the tube 15 which is situated in the region of the profilation of the mandrels is heated to shrinking, so that the portion 24 is made to fit accurately against the profiled portion of the combined mandrels. After the plastic material has been stabilized by cooling, the mandrels 16,17 can be separated from one another by relative axial movements, whereupon the shaped tube 15 with its shrunk portions 18,19, shown in FIG. 5, can be separated along the line 20 so as to obtain two pieces of package units. These can thereafter be closed or provided with a cap arrangement, filled and finally sealed in the manner mentioned above.

The advantage of the method of producing two package units at the same time lies in the fact that in the opening arrangements formed, which are defined by the openings produced when the tubes 14 are separated along the cut line 20, the emptying opening will be even and will not require any aftertreatment or trimming. This may otherwise happen, since the rim line which defines the emptying opening of the shrunk portion frequently will be somewhat uneven after the shrinkage process. The tube produced by the above method also obtains a well-defined neck length.

In FIG. 1 an "exploded view" of the package according to the invention is illustrated and, as is evident therefrom, the tube package consists of a substantially circular-cylindrical tube body, which towards its rear end tapers off to be closed in a straight transverse seal 3. The tube package, moreover, includes a dome-shaped or curved portion which terminates in a preferably circular emptying opening 5. Along the whole tube body 1 extends a longitudinal sealing joint 2 whose end points are located at the transverse sealing joint 3 and at the edge of the emptying opening 5 respectively.

As mentioned above, the tube package can be closed with the help of tube closing means such as a prefabricated cap arrangement which in accordance with FIG. 1 may include an injection moulded part 6 which has a tubular emptying opening whose outside is provided with threads. The cap 6 is provided, moreover, with a likewise injection moulded collar of a plastic material and a screw cap 7 of conventional type.

The prefabricated cap arrangement 6,7 may be applied to the tube package around the emptying opening 5 while the shrunk tube 8,15 is still threaded on its mandrel 9. The cap part 6 is made preferably of the same plastic material as the tube body, which should be a plastic material which can be sealed with the help of high-frequency, e.g. BAREX. The application of the cap part 6 takes place so that the same is pressed with a special tool (not illustrated), which is combined with a high-frequency coil, against the area around the emptying opening 5, the inner mandrel 9 forming the holding-up tool. With the help of the high-frequency electric field the plastic material of the collar of the cap part 6 as well as the border zones around the emptying opening 5 are heated, whereupon the cap part 6 is made to fuse together with the front part of the tube package since it is pressed with great force against the shrunk part of the tube.

It has been found that tube packages of the type mentioned here can be manufactured considerably more efficiently and hence more inexpensively than conventional tube packages. Since they can be made of considerably thinner plastic material than conventional tube packages which are extruded but not orientation-stretched, the material costs too will be lower. Moreover, the tube packages may be used for the packing of goods which must not be exposed to oxygen or which contain solvents or other aggressive chemicals for which ordinary plastic materials of the polyethylene, polypropylene or polyvinylchloride type cannot be used as packing material.

The principles, preferred embodiments and modes of operation of the present invention have been described in the foregoing specification. The invention which is intended to be protected herein should not, however, be construed as limited to the particular forms disclosed, as these are to be regarded as illustrative rather then restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. A method for manufacturing tubular packing containers, comprising:

cutting a web of an oriented plastic material into shorter lengths substantially corresponding to a desired circumference of the tubular packing containers;

folding its shorter length of web into a tube by overlapping opposed end portions of the web, said opposing end portions having opposing surfaces;

extruding a string of melted plastic material onto at least one of said opposing surfaces of the overlapping opposed edge portions of the web;

pressing said overlapping edge portions of the web to each other aginst said string so as to prevent release of orientation stresses of the plastic material thereby avoiding shrinkage of the overlapping opposed edge portions of the web;

placing each tube of web material on a mandrel;

heating a portion of each tube thereby shrinking that portion of the tube over an underlying profiled portion of the mandrel; and removing the tube from the mandrel.

2. The method of claim 1, wherein the plastic material is biaxially oriented.

3. The method of claim 1 further comprising the steps of:

welding a cap arrangement over said shrunk portion of the tube;

filling the tube with contents; and flattening and transversely sealing an end of the tube opposite said cap arrangement.

4. The method of claim 1 wherein two tubular packing containers are simultaneously manufactured, said mandrel being centrally divisible and having two mandrel portions with the two mandrel portions having abutting profiled end portions whereby a central portion of said tube is heated to shrink said central portion over said abutting profiled end portions and wherein the tube is removed from said mandrel by spacing said abutting mandrel portions from each other, said tube being subsequently divided into two packing containers by transversely cutting the tube along said shrunk central portion.

5. A method for manufacturing tubular packing containers, comprising:

cutting a web of oriented plastic material into shorter lengths substantially corresponding to a desired circumference of the tubular packing containers;

folding each shorter length of web into a tube by overlapping opposed longitudinal edge portions of the web;

sealing said overlapping edge portions of the web to each other;

placing each tube of web material on a pair of mandrels having abutting profiled end portions;

heating a central portion of each tube thereby shrinking that portion of the tube over said abutting profiled end portions;

removing the tube from said pair of mandrels by separating said two mandrels from each other;

dividing said tube into two packing containers by transversely cutting said tube along said shrunk central portion; and securing tube closing means over said shrunk portion of each tube.

6. The method of claim 1 or 5 further comprising the step of:

printing a package design on the web before the web is cut into shorter lengths, said printing being done in such a way that one complete package design appears on each tubular packing container.

* * * * *